United States Patent Office 3,319,809
Patented May 16, 1967

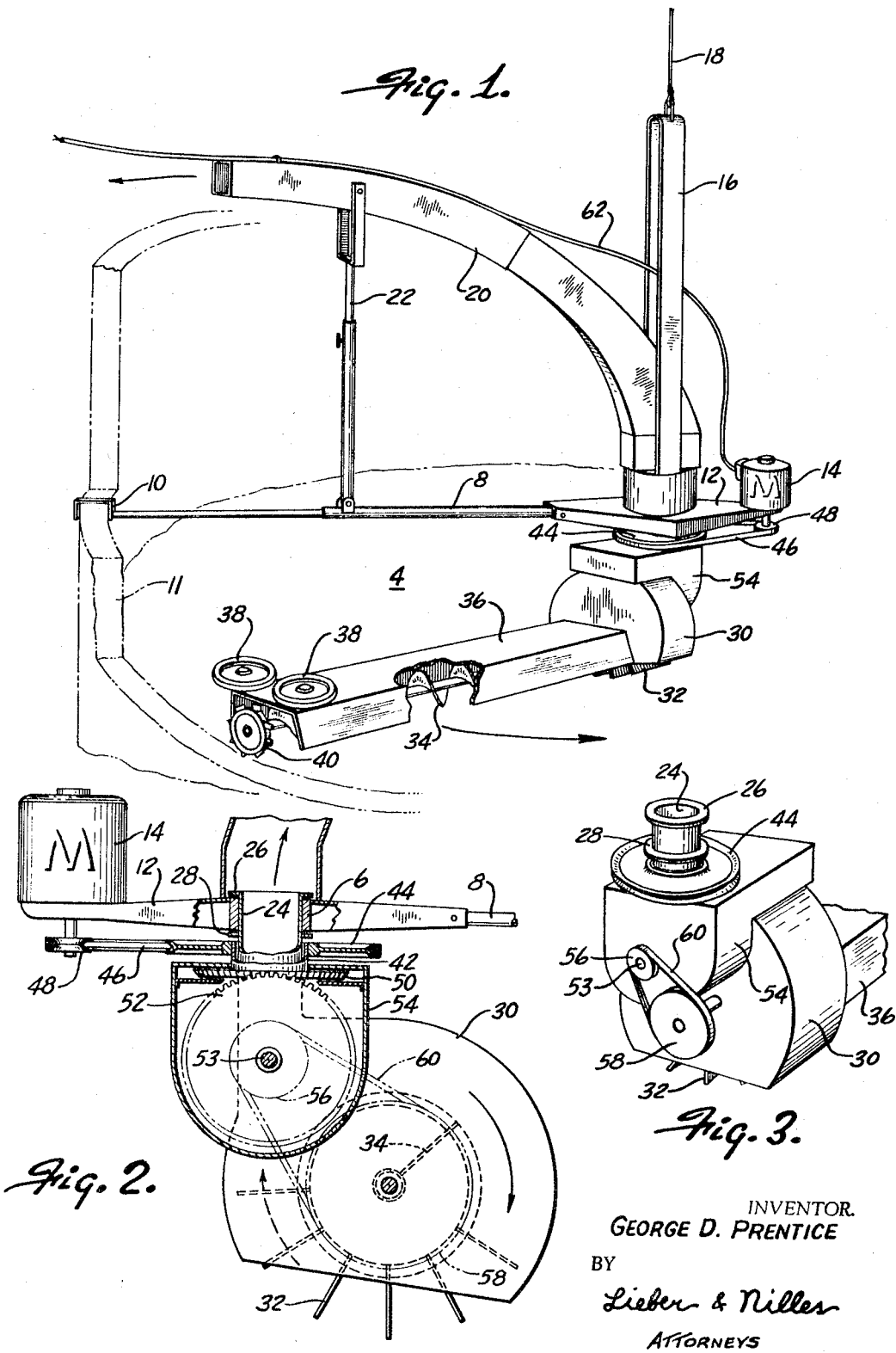

3,319,809
SILO UNLOADER
George D. Prentice, Milwaukee, Wis., assignor to A. F. Klinzing Co., Inc., Milwaukee, Wis., a corporation of Wisconsin
Filed Aug. 26, 1965, Ser. No. 482,732
7 Claims. (Cl. 214—17)

ABSTRACT OF THE DISCLOSURE

This invention relates to unloaders for silos or other bulk storage containers. More particularly, the present invention relates to an improved silo unloader of simplified construction in which numerous mechanical and electrical components found in prior art unloaders are eliminated.

PRIOR ART

Unloaders of the type with which this invention is concerned include a rotating conveyor portion positioned in the center of the silo by a stationary or non-rotating arm extending to the wall of the silo. The unloader rests on top of the silage and normally employs an auger screw or chain scraper to move the silage to the center of the silo as the rotating portion of the unloader revolves on a pivot in the non-rotating arm. The rotating portion is commonly driven by a cleated wheel which engages the surface of the silage. A discharge spout is non-rotatably mounted on the arm to direct the silage being unloaded from the center of the silo into a chute extending to an opening in the side wall of the silo for delivery to ground level. The auger wheel or chain scraper, the cleated wheel or other mechanism to rotate the unloader, and the mechanism to direct the unloaded silage through the discharge spout have generally heretofore been powered by an electric motor or the like mounted on the rotating portion of the unloader.

In order to supply power from the stationary arm to the motor carried on the rotating portion of the unloader, a collector ring-and-brush mechanism has usually been employed. However, in addition to increasing the cost and complexity of the unloader, the collector ring-and-brush mechanism has undesirably increased the fire hazard associated with the use of such an unloader because of the inevitable sparking between the collector rings and the brushes. Furthermore, the industry has experienced a high incidence of mechanical and electrical trouble in the use of such an unloader due to the detrimental effects of chaff, dust, dirt, and moisture from condensation or the silage.

The use of the cleated drive wheel, or "bull wheel" to rotate the unloader has also frequently caused operational problems. While the cleated wheel drive may operate quite satisfactorily in hard or compact silage, the wheel has a tendency to slip or bury itself in lighter feeds or in granular material such as shelled corn, ground corn, and corncob mix and fails to supply the required amount of rotation to the unloader. In addition, these drive wheels are subject to clogging and the like when operating on wet and sticky materials.

Prior efforts to provide an unloader having a stationary motor, which could be connected to the power source without the use of the collector ring-brush assembly, and having a more satisfactory means for rotating the silo unloader have resulted in complicated mechanical constructions for providing the necessary power and rotary motion to the silo unloader. This, in turn, has not only added to the expense of these devices but has also caused serious problems in the maintenance and repair of the unloader since its operating environment does not lend itself well to either routine maintenance or ease of access for repairs.

SUMMARY OF THE INVENTION

The present invention therefore contemplates the provision of an improved unloader for bulk storage containers employing a stationary electric motor as a power source, thereby eliminating the need for utilizing a collector ring-brush assembly as required by prior art silo unloaders utilizing an electric motor mounted on the rotating parts of the unloader.

The present invention also provides an unloader which includes a simple, effective means for rotating the unloader, thereby eliminating the cleated wheel formerly used for this purpose.

Additionally, the present invention provides the unloader which is of simple, mechanically rugged construction and which imparts substantially trouble free operation for substantial periods of time to the unloader.

These advantages are accomplished by employing a differential principle wherein the resistance to the entire silo unloader circumferentially traversing the silo is mechanically balanced with the resistance of the turning of the auger conveyor as it engages the silage material being operated upon.

DESCRIPTION OF DRAWINGS

The invention may be better understood by reference to the following specification and drawing, forming a part thereof in which:

FIGURE 1 is a perspective view of the silo unloader of the present invention;

FIGURE 2 is an end view of the improved mechanism with certain portions thereof shown in cross-section and in phantom; and FIGURE 3 is a fragmentary perspective end view of the device.

Referring now to the drawing, there is shown therein a silo unloader of the present invention indicated by the numeral 4. The unloader 4 includes a support member in the form of a collar 6. Radiating from the collar 6 is a stabilizing or stator arm 8 which positions collar 6 in the center of the silo by means of a suitable clamp or hook 10 fastened to the silo wall. On the side of the collar 6 remote from the arm 8 is a motor platform 12 on which is mounted an electric motor 14. A bifurcated hanger assembly 16 may be mounted on the collar 6 to control the vertical position of unloader 4 by means of a cable 18 or the like strung through blocks (not shown) in the top of the silo. A discharge spout 20 is also mounted on the collar 6 to direct the unloaded silage from the silo. In addition to being supported by the collar 6, the discharge spout 20 is preferably supported from the arm 8 by a strut 22. Thus, the arm 8, motor platform 12, motor 14, hanger 16, and chute 20 are all restrained from rotational movement within the silo.

A sleeve 24 having an upper flange 26 and a lower flange 28 is rotatably mounted and retained in the collar 6. The lower end of sleeve 24 is connected to and supports a shroud 30 which provides a mount for a blower 32 and an auger screw 34 which moves the silage to the center of the silo and into the blower 32. The auger screw 34 is preferably housed within a guard 36 having wheels 38 peripherally engageable with the wall of the silo to thereby guide the auger as it traverses the silage. The auger screw 34 terminates at its outer end with a cutter wheel 40 for loosening the silage adjacent the silo wall.

A tube 42 surrounds the sleeve 24 below flange 28, and a sheave 44 is mounted on the upper end of this tube 42 and provides rotation to the tube by means of a drive belt 46 and pulley 48 mounted on the output shaft of motor 14. A bevelled pinion gear 50 is secured to the lower end of the rotatable tube 42 to engage a gear 52. The gear 52 is mounted at right angles to the bevelled pinion gear 50 by means of a shaft 53 journalled in the gear housing 54. The axis of the shaft 53 intersects the axis of the tube 42 at a ninety degree angle, and the gears 50 and 52 are housed within a suitable housing 54 for lubrication and protection purposes.

A sheave 56, keyed to the shaft of the gear 52 for rotation therewith, drives a sheave 58 by means of a belt 60 or the like. The sheave 58 thus provides rotary power to the blower 32 and auger screw 34.

The operation of the improved silo unloader is as follows. The silo unloader 4 is lowered to the top of the silage and positioned in the center of the silo by cable 18 and stator arm 8. Clamp 10 is affixed to the silo wall at an opening which is provided in the wall for the output from the discharge chute 20. Electric power is provided to the electric motor 14 by means of a power cable 62. The motor 14 drives the tube 42 and bevelled pinion gear 50 by means of belt 46 and sheaves 48 and 44. As the bevelled pinion gear 50 rotates, gear 52, which is in mesh with the pinion gear, attempts to move in a horizontal plane. The torque thus created causes the rotating portion of the unloader, including housing 54, shroud 30, and auger screw 34 to rotate. In other words, the motor driven pinion gear 50 tends to rotate the gear 52, but when the gear 52 is under load as imposed through the weight of the assemblage and engagement of the auger 34 with the silage, rotation of the gear 52 is restrained. Therefore, the housing 54, shroud 30 and auger 34 are caused to revolve about a vertical axis dependent upon the load on gear 52.

These parts will move about the pivot provided by sleeve 24 in the collar 6 until the silage on which the unloader is supported provides sufficient resistance to prevent such rotation. The collar 6 is, of course, positioned by the arm 8, and when the gear housing 54 becomes stationary, the rotation of the gear 52 and shaft 53 within the housing 54 will provide power through the belt 60 to the blower 32 and auger screw 34. The auger screw moves the silage to the center of the silo where it is picked up by blower 32 and discharged from the silo through sleeve 24 and discharge spout 20. As the auger screw 34 continues to remove the silage, it extends the width of the channel dug in the silage, thereby permitting housing 54, shroud 30, and auger screw 34 to continue to be rotated in a horizontal plane. The above described operation is continuously repeated as the auger screw 34 operates upon the silage.

From the foregoing description, it will be appreciated that the unloader of the present invention operates on a differential principle in that it supplies power to the one of two mechanisms having a lesser torque load. Thus, if the resistance to rotation of the unloader 4 provided by the silage is slight, the unloader will be rotated by the mechanism of gears 50 and 52 about the axis of tube 42. As this resistance increases, more power will be transferred to the mechanism of auger screw 34 and blower 32 and the auger will operate to remove silage from the silo at a faster rate. The removal of the silage lessens the resistance to rotation provided thereby, causing torque to be reapplied to the mechanism rotating unloader 4 permitting more rapid changes in the position of the unloader.

It will be further appreciated that the present invention eliminates two expensive and mechanically complicated assemblies from unloaders found in the prior art. The first of these is commutator ring-brush assembly. The second is the cleated wheel and its associated drive means used to rotate the unloader about the inside of the silo. The resulting unloader of the present invention therefore forms a more satisfactory, reliable unloader than has heretofore been developed.

Various modes of carrying out the invention are contemplated as being within the scope of the following claims particularly pointing out and distinctly claiming the subject matter which is regarded as the invention.

I claim:

1. Apparatus for unloading material from a bulk storage container comprising, means providing a non-rotatable support within the storage container, a motor fixedly mounted on said support, material gathering and discharge means rotatably carried by said support, said material gathering and discharge means including a radiating conveyor for moving material toward a pickup station, means for removing the material from the pickup station and discharging the same exteriorly of the container, and power transmission means independently rotatably carried by said support and drivingly connecting said motor with said material gathering and discharge means for revolving the same in a horizontal plane relative to said support and for additionally driving both the radiating conveyor and the discharge means at speeds dependent upon the torque imposed on said drive means.

2. Apparatus for unloading material from a bulk storage container according to claim 1, wherein the non-rotatable support includes a collar which rotatably carries the material gathering and discharge means and which independently rotatably carries the power transmission means.

3. Apparatus for unloading material from a bulk storage container comprising: a non-rotatable portion including, a collar, an arm radiating from said collar and coacting with the storage container to non-rotatably retain said collar in the desired position in the container, a motor platform and a discharge chute mounted on said collar for conveying the silage from the storage container, and a motor mounted on said platform; and a rotating material unloading portion including a sleeve rotatably supported by said collar and having a housing on the lower portion thereof, a silage gathering means and a silage discharge means communicable with said housing, and power transmission means within said housing and connected to said motor, said silage gathering and discharge means and said power transmission means being independently rotatably supported.

4. Apparatus for unloading material from a bulk storage container comprising: a non-rotating portion including, a collar, an arm supporting said collar and fixed to the storage container to retain said collar in the desired position in the container, said arm including a motor platform and a discharge chute for conveying the silage from the storage container, and a motor mounted on said platform; and a rotating material unloading portion including a sleeve journalled in said collar and having a housing on the lower portion thereof, a silage gathering means and a silage discharge means mounted on said housing, a tube journalled on the exterior of said sleeve and having a power transmission means connected to said motor and also having a pinion gear mounted thereon inside of said housing, said housing containing a gear journalled therein and connected to said silage gathering means and said silage discharge means, said gear engaging said pinion gear to rotate the material unloading portion in the collar and to also provide power to said silage gathering means and said silage discharge means to thereby unload the storage container.

5. The apparatus of claim 4, in which the axis of rotation of the gear which is engaged with the pinion gear intersects the axis of said tube.

6. The apparatus of claim 4, in which the axis of rotation of said gear intersects the axis of said tube at an angle of ninety degrees.

7. The silo unloader of claim 4, in which said silage gathering means and said discharge means are mounted on a common shaft.

References Cited by the Examiner
UNITED STATES PATENTS

| | | | |
|---|---|---|---|
| 3,204,786 | 9/1965 | Kucera | 214—17 |
| 3,246,776 | 4/1966 | Spencer et al. | 214—17 |

GERALD M. FORLENZA, *Primary Examiner.*

ROBERT G. SHERIDAN, *Examiner.*